Jan. 5, 1926. 1,568,641
J. J. THACHER
ATTACHMENT FOR AUTOMATIC LATHES
Filed April 8, 1922 2 Sheets-Sheet 1

Inventor
John J. Thacher
By Joseph N. Schofield
Attorney

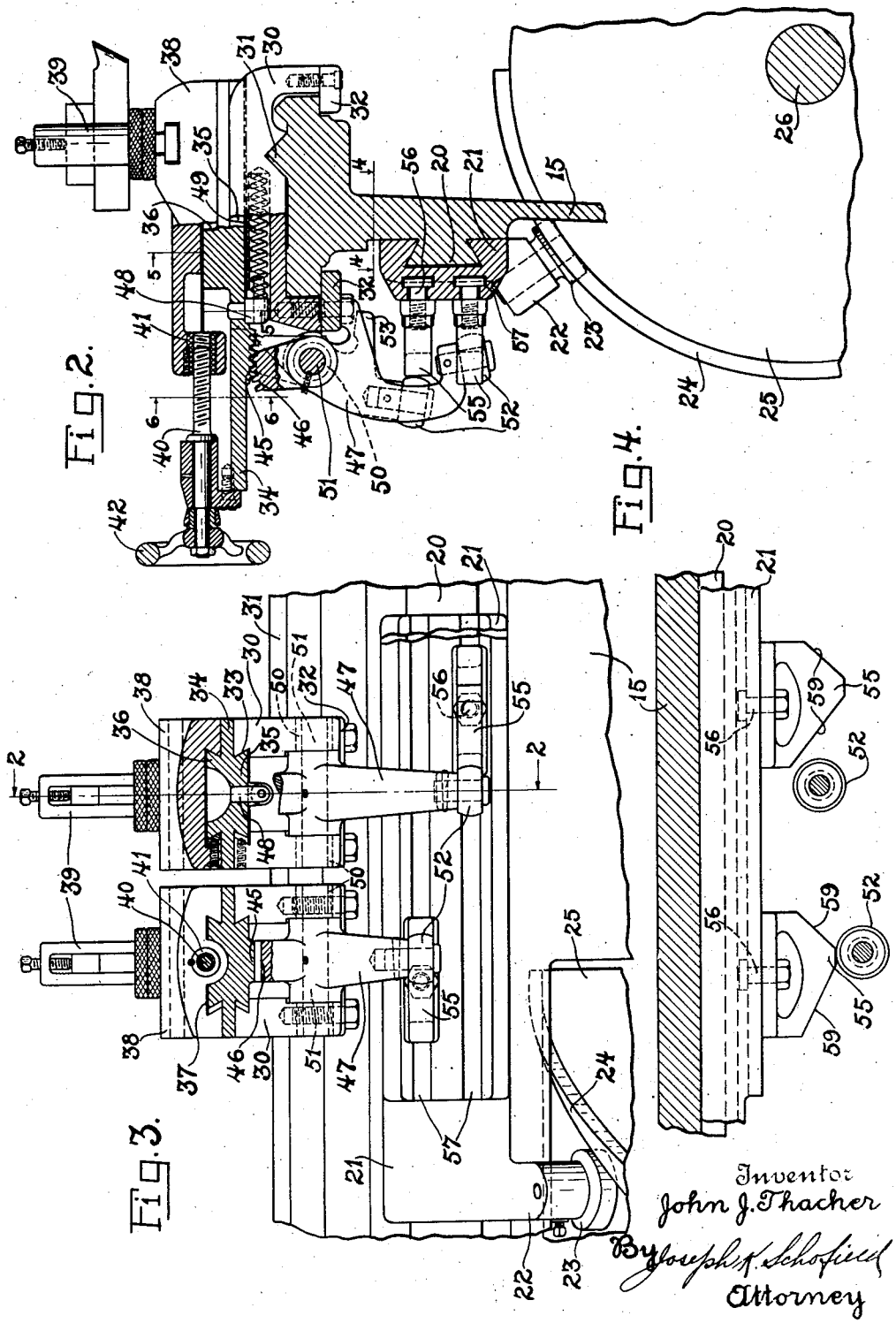

Patented Jan. 5, 1926.

1,568,641

UNITED STATES PATENT OFFICE.

JOHN J. THACHER, OF WETHERSFIELD, CONNECTICUT, ASSIGNOR TO PRATT & WHITNEY COMPANY, OF NEW YORK, N. Y., A CORPORATION OF NEW JERSEY.

ATTACHMENT FOR AUTOMATIC LATHES.

Application filed April 8, 1922. Serial No. 550,582.

*To all whom it may concern:*

Be it known that I, JOHN J. THACHER, a citizen of the United States, residing at Wethersfield, in the county of Hartford and State of Connecticut, have invented certain new and useful Improvements in Attachments for Automatic Lathes, of which the following is a specification.

This invention relates to a cross feeding mechanism for a lathe tool. In particular the invention is adapted for use as a necking attachment adapted to be applied to an automatic lathe whereby one or more tools may be advanced radially toward the work in any predetermined adjustable position and either successively or simultaneously.

A principal object of the present invention is to provide an automatic lathe, preferably of the type disclosed in my Patent No. 1,507,265 dated September 2, 1924, with a necking attachment adapted to advance a plurality of tools radially toward the axis about which the work is rotated.

Another object of the invention is to provide a necking attachment for automatic lathes which will permit a plurality of necking tools to be advanced into and completely retracted from the work while the work is being rotated and previously to its being released from the machine.

One feature which enables me to accomplish the above objects is that I provide a sliding plate adapted to be periodically operated by automatically operating mechanism which is mounted upon a longitudinally extending guideway on the base as disclosed in my above referred to patent. On this sliding plate a plurality of cams are adapted to be adjustably mounted and, contacting with these cams, are levers each adapted at its upper end to engage a tool slide on which one of the cutting tools is mounted. By reciprocations of the sliding plate the tools are successively moved toward and from the work.

Another object which is of advantage is that a plurality of closely adjacent cross feeding tools may be operated in any adjusted position along the bed of the lathe. A further object of the invention is to locate the cams on the reciprocating slide so that the tools may be advanced toward the work progressively or successively in order that all of the tools may not be in engagement with the work simultaneously.

With these and other objects in view, my invention consists in the features of construction and operation set forth in the following specification and illustrated in the accompanying drawings.

In the accompanying drawings annexed hereto and forming a part of this specification, I have shown my invention embodied in an automatic lathe adapted to automatically load a blank in operative position on centers, automatically rotate same while a tool is working thereon and finally automatically release it and load another blank. It will be understood, however, that the invention can be otherwise embodied and that the drawings are not to be construed as defining or limiting the scope of the invention, the claims appended to this specification being relied upon for that purpose.

In the drawings:

Fig. 2 is a transverse sectional view taken on line 2—2 of Fig. 3.

Fig. 3 is a front elevation of the cross feeding slides and reciprocating slide on an enlarged scale.

Fig. 4 is a detail view of the reciprocatory slide and its adjustable cams taken on line 4—4 of Fig. 2.

Figure 1:
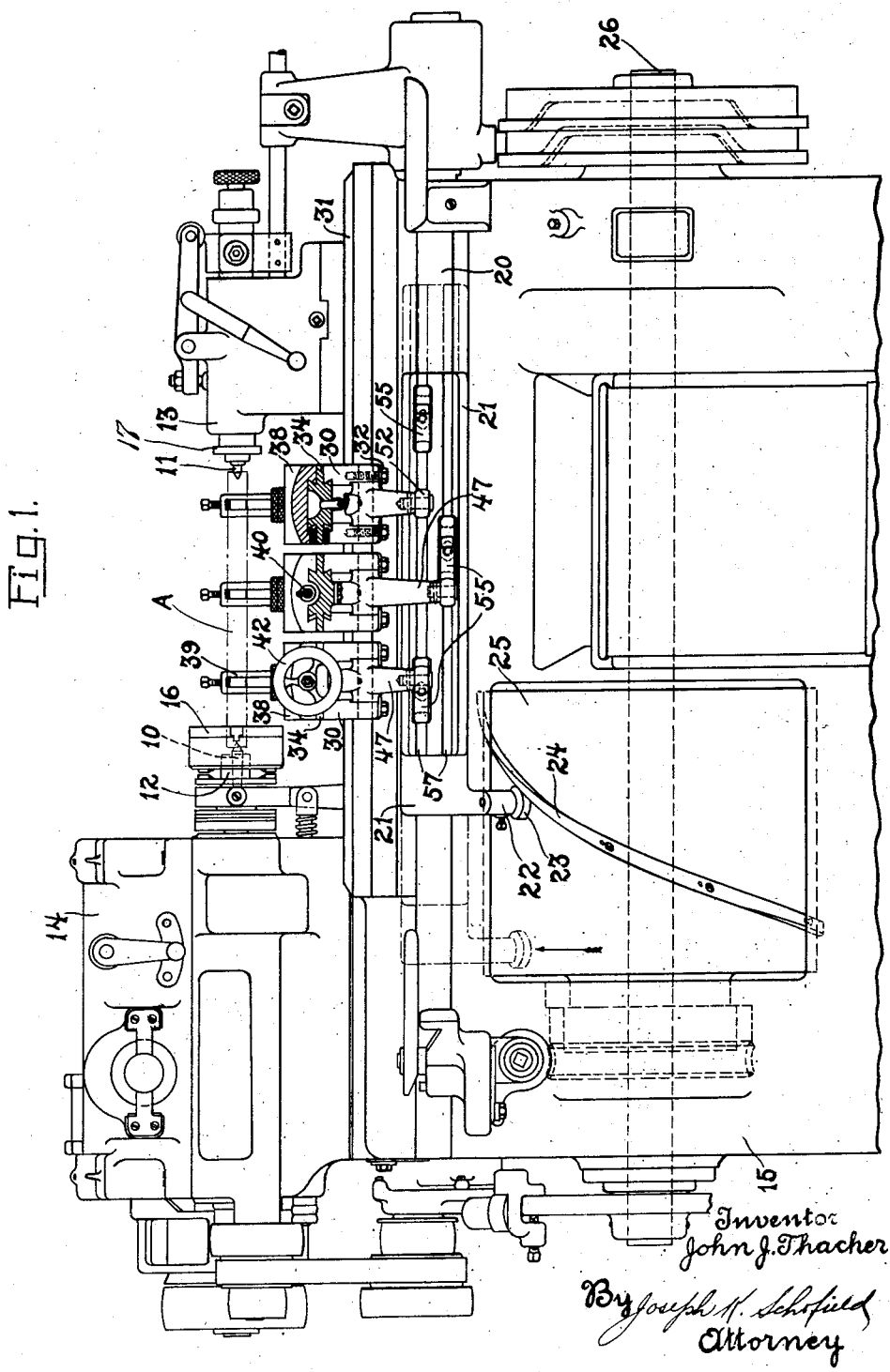
Figure 1 is a front elevation of an automatic lathe embodying the present invention.

In the above mentioned drawings, I have shown but one modification of the invention which is now deemed preferable but it is to be understood that changes and modifications may be made within the scope of the appended claims without departing from the spirit of the invention.

Briefly, my invention in its broadest aspect comprises the following principal parts: first, a tool carriage adapted to be adjustably fixed to the bed of an automatic lathe; second, a slide movable thereon and adapted to carry a cutting tool near its rearward end; third, an oscillating lever pivotally mounted in the tool carriage and adapted to engage and reciprocate the tool slide; fourth, a longitudinally reciprocating slide on the lathe bed adapted to carry adjustable cams each engaging the lower end of one of said oscillating levers; and fifth, means to periodically reciprocate the cam carrying slide in timed relation to the other operations of the lathe.

Referring more in detail to the figures of the drawings, an automatic lathe of the type disclosed in my patent above mentioned is shown in which the present invention is embodied. As the principal parts of the automatic lathe are fully disclosed in the above mentioned patent, a detailed description and complete drawings of these parts are unnecessary. It may be stated, however, that work such as A is supported upon opposed centers 10 and 11, one of which is mounted in the headstock spindle 12 and the other in the plunger within the tailblock 13. The headstock spindle 12 is rotatably mounted in a headstock 14 which may be of the multiple speed, geared type. This is positioned on the upper surface and at one end of the base 15 of the automatic lathe. The work A is rotated by means of a chuck 16 flexibly mounted on the headstock spindle 12 but positively rotated thereby. The tailblock plunger 17 in the tailblock 13 is automatically advanced and retracted to engage the blank A being operated on, and the chuck 16 is also automatically opened and closed. All of the above operations, together with the transferring of the blanks A to their operative position, take place periodically and automatically in accordance with the sequence of operations disclosed in the above mentioned patent.

On the front vertical surface of the automatic lathe is a longitudinal dovetailed projection 20 on which is mounted a slide 21. This slide 21 at one end has an extension 22 carrying a small roller 23 adapted to contact with the helical surfaces of strip cams 24 mounted on a rotatably mounted drum 25. This drum is rotated by the main cam shaft 26 in the base of the lathe 15 and the slide 21 is therefore reciprocated in timed relation to the other operations of the machine controlled by rotation of the cam shaft 26. It will be seen from this construction that the reciprocations of the slide 21 will be periodic and always through the same distance. Also by varying the speed of rotation of the cam shaft 26, the speed of reciprocation of the slide 21 is widely varied. It is the periodic reciprocation of this slide 21 by means of which the tool slides are operated.

Adjustably mounted on the bed of the automatic lathe 15, preferably as shown in Fig. 3, are tool carriages 30 adapted to engage the ways 31 on the bed or base 15 and having flanges 32 engaging the lower surfaces of the ways. At least some of these flanges 32 are adapted to be readily clamped and unclamped so that these carriages 30 may therefore be readily and adjustably positioned at any point along the bed and secured firmly in that position. On the upper surface of each tool carriage 30 is a dovetailed recess 33 in which an intermediate slide 34 is slidably mounted, this slide having a dovetailed projection 35 fitting the dovetail recess 33 in the tool carriage 30. The intermediate slide 34 on its upper surface is provided with a dovetailed projection 36 which is engaged by a dovetailed recess 37 in a tool slide 38. This tool slide 38 near one end is provided with tool attaching means 39 such as the T-slot and tool post shown in Figs. 2 and 3.

Each intermediate slide 34 above referred to is provided with a rotatably mounted screw 40 engaging a nut 41 fixed in the forward end of its tool slide 38. It will be seen therefore that rotation of this screw 40 by the handle 42 adjusts the position of the tool slide 38 at any distance from the work axis. The intermediate slide 34 on its lower surface is provided with a plurality of rack teeth 45. These are clearly shown in Fig. 2 and are adapted to be engaged by gear teeth 46 on the upper end of a pivotally mounted lever 47. Also on the intermediate slide is a stud 48 extending into a recess in which is mounted a coiled spring 49. This, as will be seen in Fig. 2, resiliently forces the intermediate slide 34 and therefore the tool slide 38 away from the work axis. To more clearly show the details of construction of the tool carriages 30 and their associated parts, the different tool slides in Figs. 1 and 3 are shown on different sections. These sections are taken respectively on lines 5—5 and 6—6 of Fig. 2.

On the tool carriages are opposite bearings 50, the axis of which is parallel to the work axis and in which is mounted shaft 51 about which the oscillating lever may oscillate. This lever 47 is provided with a downward extension at the end of which is a small roller 52. A projection 53 formed on each lever 47 is adapted to bear against the lower surface of the ways of the lathe when the lever is in one extreme position of its oscillation. This limits the oscillation of the lever 47 in one direction. The limit of oscillation in the other direction is governed by means of the cams presently to be described.

On the reciprocating slide 21 above referred to are cam plates 55 preferably adjustable along the reciprocating plate 21 by means of short bolts 56 extending into T-slots 57 provided in the slide 21. These cams 55, as shown in Fig. 4, are provided with oblique or inclined surfaces 58 and 59 which, by reciprocation of the slide 21, oscillate the levers 47 and thus force the tool slides 38 toward the work axis. As shown in Figs. 3 and 4, these cams 55 are adjustably mounted along the reciprocating slide 21 and are preferably provided in different T-slots so that they may be at different distances below the work axis. For this purpose I provide the reciprocating slide with two parallel T-slots 57 each of which may have one or more cams 55 adjustably secured thereto.

As the invention is primarily adapted for operating a plurality of cross feeding or necking tools so that the work being operated upon may be provided with a number of accurately spaced radial faces, I mount a plurality of the tool carriages 30 upon the ways of the lathe bed and adjust the cams 55 on the reciprocating slide 21 to operate each of the slides 38 independently of the others. As the side thrust against the work would be unduly great if all of the tools were simultaneously operating upon the work, I preferably arrange the cams far enough apart on the slide so that the tool slides may be successively operated. This may conveniently be done by positioning the cam controlling the first tool slide 38 so that this slide will first be advanced toward the work and, after it has reached its innermost position, the cam operating the second tool slide may oscillate its lever and advance its tool to its innermost position. As soon as this has completed its movement toward its innermost position, the third or any additional number of tools may be successively operated. The distance through which the slide 21 reciprocates may be constant, the parts of the stroke before the first tool slide is advanced toward the work and after the last tool slide is advanced, being an idle movement thereof. The return movement of the slide also oscillates the levers 47 and thus reciprocates the tool slides 38. This movement takes place however while the completed blank is being released and a new blank positioned so that this movement of the tool slides is inoperative.

It will be seen from the above that I have provided a simple, convenient and readily adjusted and operated mechanism adapted to be supplied to a standard form of automatic lathe which will permit application to the construction described in my above referred to application. It is also constructed in such a manner that it will not interfere with or require rearrangement of the automatic mechanisms for loading the work into the machine or rotating the work. This permits the attachment to be employed without redesigning the other mechanisms of the lathe. Also in this connection, I preferably so form the reciprocatory slide 21 that it will interchange with the slide corresponding thereto disclosed in the patent above mentioned. This adapts one of the automatic lathes either for cylindrical turning or for necking operations by simply substituting one slide for the other on the guideway or projection 20.

Also the provision of the slots 57 in the slide 21 at different distances below the tool carriages 30, each of which is provided with adjustable cams 55, permits the tool slides 38 to be advanced at different speeds due to the difference in length of the levers 47. The longer lever 47 operating the middle tool slide 38 will of course advance its tool slide more slowly than the others as the oscillation of this lever will be slower. The reduction in speed of operation of the tool slide operated by the longer lever will, however, give increased power to this slide permitting its use for relatively broader radially operating tools such as contour or formed tools.

What I claim is:

1. A cross feed mechanism for a lathe, comprising in combination, a plurality of tool carriages adapted to be adjustably positioned on a lathe, slides mounted thereon and adapted to support tools in operative position, an oscillatory lever on each of said tool carriages and engaging its slides so that oscillation of said levers moves each of said tool slides, and a reciprocatory slide having cams fixed thereon adapted to engage and oscillate said lever.

2. A cross feed mechanism for lathes comprising in combination, a plurality of tool carriages adjustably mounted on the lathe, tool slides movable transversely thereon, a rack formed on the lower surface of each of said slides, oscillating levers having teeth engaging each of said racks, a cam carrying slide having adjustable cams thereon adapted to contact with and oscillate said levers when reciprocated past said levers, and automatic means to periodically reciprocate said cam carrying slide through a predetermined constant distance.

3. A cross feed mechanism for lathes comprising in combination, a plurality of tool carriages adjustably mounted on said lathe, tool slides thereon, oscillating levers attached to each of said slides, a cam carrying slide having a plurality of adjustably mounted cams thereon adapted respectively to contact with and oscillate said levers, and automatic means to reciprocate said cam carrying slide whereby with each reciprocation of the cam carrying slide each of said tool slides may be successively advanced toward and withdrawn from the work.

4. A cross feed mechanism for automatic lathes comprising in combination, a plurality of tool carriages adjustably mounted on said lathe, tool slides thereon, oscillating levers attached to each of said slides, a cam carrying slide having a plurality of adjustably mounted cams thereon adapted respectively to contact with and oscillate said levers, and automatic means to periodically reciprocate said cam carrying slide whereby with each reciprocation of the cam carrying slide each of said tool slides is successively advanced toward and withdrawn from the work.

5. A cross feed mechanism for automatic lathes comprising in combination, a plurality of tool carriages adjustably mounted on said lathe, tool slides thereon, oscillating levers attached to each of said slides whereby oscillation of said lever moves said slides, a cam carrying slide having a plurality of adjustably mounted cams thereon adapted respectively to contact with and oscillate said levers, and automatic means to reciprocate said cam carrying slide through a constant distance whereby with each reciprocation of the cam carrying slide each of said tool slides may be successively advanced toward and withdrawn from the work.

6. An automatic lathe comprising in combination, a base having a longitudinally extending guideway thereon, means to support and rotate work in said lathe, cross feeding tools on said base, a reciprocatory slide having cams adjustably fixed thereon mounted on said guideway, means to reciprocate said slide, levers operated by reciprocation of said cams with said slide to successively advance said tools while said work is being rotated, and means to retract said tools while said work is still being supported and held.

7. An automatic lathe comprising in combination, a base having a guideway extending longitudinally thereon, a reciprocatory slide on said guideway, means to reciprocate said slide, a cam adjustably positioned on said slide, and means operated by the reciprocation of said slide and cam to advance a tool radially toward the axis of rotation of work mounted in said lathe.

8. An automatic lathe comprising in combination, a base having a guideway extending longitudinally thereon, a reciprocatory slide on said guideway, means to reciprocate said slide, a cam adjustably positioned on said slide, and lever operated by reciprocation of said slide to advance a tool radially toward the axis of rotation of work mounted in said lathe.

9. An automatic lathe comprising in combination, a base having a guideway extending longitudinally thereon, a reciprocatory slide on said guideway, means to reciprocate said slide, a cross feeding tool adjustably positioned on said base, and cam means operated by the reciprocation of said slide to advance said tool radially toward the axis of rotation of work mounted in said lathe at any point in the stroke of said reciprocatory slide.

10. An automatic lathe comprising in combination, a base having a guideway extending longitudinally thereon, a reciprocatory slide on said guideway, means to reciprocate said slide, cross feeding tools adjustably positioned on said base, and cam means operated by the reciprocation of said slide to advance said tools radially toward the axis of rotation of work mounted in said lathe, said cam means being arranged to successively advance said tools at different points in the stroke of said reciprocatory slide.

11. A cross feed mechanism for a lathe comprising in combination, a plurality of tool carriages adapted to be adjustably positioned on the lathe, a tool slide movably mounted on each carriage and adapted to support a tool in operative position, and a reciprocatory slide having means thereon to move said tool slides, said means being adapted to advance said tool slides at different points in the stroke of said reciprocatory slide and at different speeds.

12. A cross feed mechanism for a lathe comprising in combination, a plurality of tool carriages adapted to be adjustably positioned on the lathe, a tool slide movably mounted on each carriage and adapted to support a tool in operative position, operating levers on said carriages adapted to engage and operate said tool slides, and a reciprocatory slide having means thereon to oscillate said levers, said means being adapted to advance said tool slides at different points in the stroke of said reciprocatory slide at different speeds and different power.

13. A cross feeding mechanism for a lathe comprising in combination, tool carriages adapted to be adjustably positioned on the lathe, a slide mounted on each carriage and adapted to support a tool in operative position, oscillatory levers on said tool carriages and engaging said slide so that oscillation of said levers moves said tool slides, some of said levers being of different lengths whereby different amounts of oscillation of said different levers are required to move said slides a predetermined distance, and a reciprocatory slide having cams fixed thereon adapted to engage and oscillate said levers.

14. A cross feed mechanism for a lathe comprising in combination, tool carriages adapted to be adjustably positioned on the lathe, a slide mounted on each carriage and adapted to support a tool in operative position, oscillatory levers on said tool carriages and engaging said slide so that oscillation of said levers moves said tool slides, some of said levers being of different lengths whereby different amounts of oscillation of said different levers are required to move said slides a predetermined distance, and a reciprocatory slide having cams adjustably fixed thereon and adapted to successively oscillate said levers and advance said slides radially at different points in the stroke of the reciprocatory slide.

In testimony whereof, I hereto affix my signature.

JOHN J. THACHER.